United States Patent
Oderwald et al.

(10) Patent No.: US 7,185,480 B2
(45) Date of Patent: Mar. 6, 2007

(54) MACHINE AND METHOD FOR BUNCHING PLANT STEMS

(75) Inventors: Michiel Peter Oderwald, Delft (NL); Andreas Gerardus Vis, Zoetermeer (NL)

(73) Assignee: Germaco B.V., Boven Karapel (NL)

( * ) Notice: Subject to any disclaimer, the term of this patent is extended or adjusted under 35 U.S.C. 154(b) by 0 days.

(21) Appl. No.: 10/670,143

(22) Filed: Sep. 24, 2003

(65) Prior Publication Data

US 2004/0206063 A1     Oct. 21, 2004

(30) Foreign Application Priority Data

Sep. 24, 2002    (NL)     .................................... 1021521

(51) Int. Cl.
*A01D 43/02*     (2006.01)
*A01D 87/00*     (2006.01)

(52) U.S. Cl. ........................................................ 56/344

(58) Field of Classification Search ................. 56/27.5, 56/344, 341; 53/399, 397, 582, 556, 176; 100/31, 6, 5, 4, 18
See application file for complete search history.

(56) References Cited

U.S. PATENT DOCUMENTS

| | | | | |
|---|---|---|---|---|
| 2,685,771 A | * | 8/1954 | Magnuson et al. ............ | 53/582 |
| 2,891,365 A | * | 6/1959 | Heckel ........................ | 543/526 |
| 2,907,157 A | * | 10/1959 | Romine ........................ | 53/529 |
| 3,221,640 A | * | 12/1965 | Arrigo ............................ | 100/5 |
| 3,563,002 A | * | 2/1971 | Givin ........................... | 53/567 |
| 3,627,300 A | * | 12/1971 | Caveney et al. ............. | 269/131 |
| 4,041,672 A | * | 8/1977 | Gularte ......................... | 53/399 |
| 4,095,391 A | * | 6/1978 | Anguiano ..................... | 53/515 |
| 4,275,649 A | * | 6/1981 | Peterson et al. ................ | 100/4 |
| 4,470,241 A | * | 9/1984 | Parry et al. .................... | 53/556 |
| 4,480,536 A | * | 11/1984 | Burns ............................. | 100/6 |
| 4,519,178 A | * | 5/1985 | Crabb, Jr. .................. | 53/136.1 |
| 4,561,234 A | * | 12/1985 | Tonus ........................... | 53/399 |
| 4,601,155 A | * | 7/1986 | Lewis .......................... | 53/176 |
| 5,377,479 A | * | 1/1995 | Wilstrand et al. ............. | 56/14.3 |
| 5,564,257 A | * | 10/1996 | Fantz et al. ..................... | 53/399 |
| 5,588,278 A | * | 12/1996 | Wynn et al. ................... | 53/399 |
| 5,718,099 A | * | 2/1998 | Fantz et al. .................... | 53/399 |
| 5,921,063 A | * | 7/1999 | Fantz et al. .................... | 53/399 |

FOREIGN PATENT DOCUMENTS

| | | |
|---|---|---|
| EP | 0 621 182 A1 | 2/1994 |
| FR | 2594794 A1 * | 8/1987 |
| NL | 8500245 | 1/1985 |
| NL | 1009091 | 7/1999 |

* cited by examiner

*Primary Examiner*—Árpád Fábián Kovács
(74) *Attorney, Agent, or Firm*—Varnum, Riddering, Schmidt & Howlett, LLP.

(57) ABSTRACT

A flexible band is tensioned between fingers, capable of gripping together, of a gripper. In the bunching of plant stems, the band is held in an opening between fingers of the gripper behind a pair of rollers. The plant stems are carried along between the pair of rollers and received in the flexible band. After a bunch has thus been gathered, the ends of the fingers are brought towards each other, and the stems in the gripper are moved away from the rollers. Subsequently, the stems are tied together.

8 Claims, 3 Drawing Sheets

MACHINE AND METHOD FOR BUNCHING PLANT STEMS

CROSS-REFERENCE TO RELATED APPLICATIONS

This application is based on and claims foreign priority based on Netherlands Patent Application No 1021521, filed Sep. 24, 2002.

STATEMENT REGARDING FEDERALLY SPONSORED RESEARCH AND DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The invention relates to a machine and method for bunching plant stems and to a gripper for such a machine. More particularly, the invention relates to a machine according to the introductory portion of claim 1.

2. Background Art

Dutch patent No. 1009091 discloses a machine for gathering plant stems into bunches. This machine utilizes a pair of rollers and a flexible band. Plant stems are natural products that do not allow of reproducibly rigid mechanical handling. The flexible band makes it possible for the plant stems to be received flexibly. The flexible band forms a loop, whose ends pass between the rollers, so that the loop projects on one side of the pair of rollers. In use, the plant stems are gathered in this loop. The plant stems are introduced between the rollers, after which a rotary movement of the rollers carries along the plant stems, clamped between the rollers, and presses them into the loop.

The ends of the band are pulled with a spring, so that the amount of band in the loop that projects outside rollers is not greater than is necessary to embrace the plant stems. Thus, the gathered stems are enclosed by the loop and also pulled against the rollers. As a result, the stems cannot fall out of the loop. When sufficient stems have been gathered, the rollers are moved apart, while the parts of the band that pass between the rollers move apart along with the rollers. As a result, the loop open sand the bunched stems can be taken out.

If the bunch is to be prevented from falling apart again when being taken out, it is desirable to tie the plant stems together before the loop opens. In that case, however, the rollers against which the bunch is pulled by the band are in the way, or at least the rotary shafts of the rollers are in the way. Thus, without transfer, it is difficult, if possible at all, to tie the bunch together. Transfer entails the risk of the stems in the bunch shifting relative to each other.

BRIEF SUMMARY OF THE INVENTION

It is one object of the invention to provide a machine for bunching plant stems which affords more freedom for tying the plant stems together and which involves a reduced risk of the stems moving relative to each other when being tied together. In particular, it is a further object to prevent the possibility of the stems, when being tied, from sagging relative to each other and/or rotating and/or falling apart.

The machine according to one aspect of the invention is characterized by the feature of claim 1, wherein the band is arranged between the fingers of a gripper, which upholds the band behind the rollers for receiving the stems. As a consequence, the gripper, after closure, can move away from the rollers, while the fingers and the band retain the stems without the stems falling out. It is now not necessary for the band to pass between the rollers while the bunch is being formed, because the loop in the band is in fact formed between the fingers.

The band is therefore preferably situated in its entirety on the gripper, without the fingers and the band embracing the shafts. Without departing from the invention, however, the ends of the band that are not tensioned between the fingers could still pass between the rollers, insofar as this does not unduly hamper the gripper being moved away from the rollers.

The machine preferably has a movement mechanism for moving the gripper and the rollers relative to each other between a receiving position and a tying position. In the receiving position, the part of the band that is tensioned between the fingers is situated on a discharge side of a plane through the rotary shafts of the rollers, so that stems carried along by the rollers are received with the band between the fingers. In the tying position, the fingers with the band enclose the received stems, while the stems, compared with the receiving position, are situated further from the rollers. Thus, the stems can be tied together in a bunch without hindrance from the rollers.

In an embodiment of the machine according to the invention, the gripper includes a pair of fingers between which a further flexible band extends, with space between the pair of fingers and the further pair of fingers for receiving the rollers in a receiving position for receiving the stems. Thus, it is possible for the stems to be engaged upon supply without their being able to tilt in the gripper.

One embodiment of the machine according to the invention comprises lips, with which the stems after transport between the rollers are pushed away from the rollers. As a consequence, the stems do not remain in contact with the rollers after they have been pressed into the flexible band. This reduces the risk of the rotary movement of the rollers damaging the stems. It is even possible, without additional risk of damage, to have the rollers rotate permanently for transporting several stems.

Another embodiment of the machine according to the invention comprises a band upholder in the gripper. The band upholder prevents the band from sagging in the gripper, as a result of which the stems, when being bunched, might end up in the bunch at unequal height relative to each other.

In another embodiment, the gripper sis provided with an opening and closing mechanism which is actuated by a stop which is mounted fixedly with respect to the rollers. Thus, in a simple manner, it is ensured that the gripper closes when the bunch is moved away from the rollers. Preferably, the gripper includes a transmission by which, if one finger is pushed open, the opening movement is transmitted to the other finger or fingers. Thus, a robust opening and closing mechanism is obtained.

These and other objects and advantages of the machine and the method for bunching plant stems will be described in more detail with reference to the following figures.

DETAILED DESCRIPTION OF THE INVENTION

Figure 1:
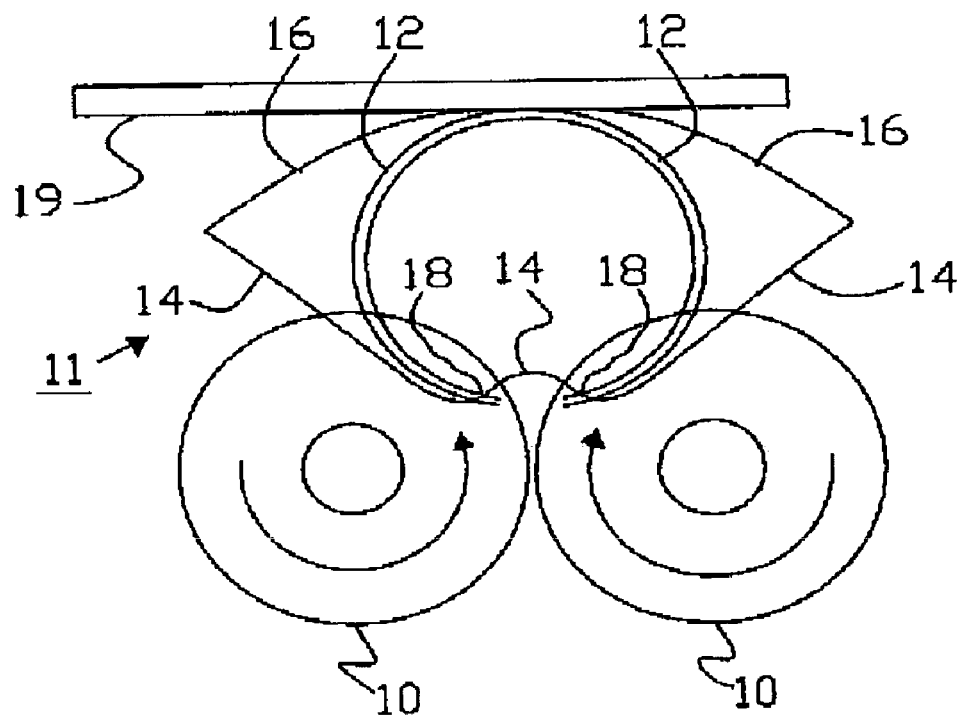
FIG. 1 shows a top plan view of a bunching machine.

FIG. 1 shows schematically a top plan view of a part of a machine for bunching plant stems. There are shown a pair of rollers 10 and a gripper 11. Rollers 10 have mutually parallel rotary shafts perpendicular to the plane of the drawing. Gripper 111 includes fingers 12, a flexible band 14 and leaf springs 16. The fingers 12 and first ends of leaf springs 16 are mounted on an arm 19. Flexible band 14 passes between two ends of leaf springs 16, essentially free-running through openings 18 in ends of fingers 12. Gripper 11 is shown in a receiving position, in which the portion of band 14 that passes between the ends of fingers 12 is situated opposite the place where rollers 10 make contact. In this receiving position, the ends of fingers 12 are situated partly below or above the rollers, viewed in the viewing direction of the drawing.

In operation, gripper 11 is brought into the receiving position (as shown in FIG. 1), in which stems are supplied, together forming a bunch. When gripper 11 has received all stems of a bunch, gripper 11 is moved away from the rollers 10 to a tying position, in which a winding is provided around the bunch of stems.

In the receiving position (shown in FIG. 1), rollers 10, at least when stems are being supplied, are in rotation (the sense of the rotation is indicated in FIG. 1 with arrows). Fingers 12 of gripper 11 are in an open position, in which the ends of the fingers including openings 18 are apart. Leaf springs 16 keep flexible band 14 under tension. Gripper 11 is so positioned relative to rollers 10 that stems carried along by the rollers are pressed into band 14 between the ends of fingers 12. The stems are introduced between the rollers one by one, after which they are carried along by the rotation of rollers 10 whilst clamped between rollers 10, so that the stems are pressed into band 14 between the ends of fingers 12. Band 14 is pressed further between fingers 13 according as more stems are being supplied. Leaf springs 16 give way, so that an increasingly larger part of band 14 is situated between openings 18 between fingers 12 according as more stems are being pressed into gripper 11.

Figure 2:
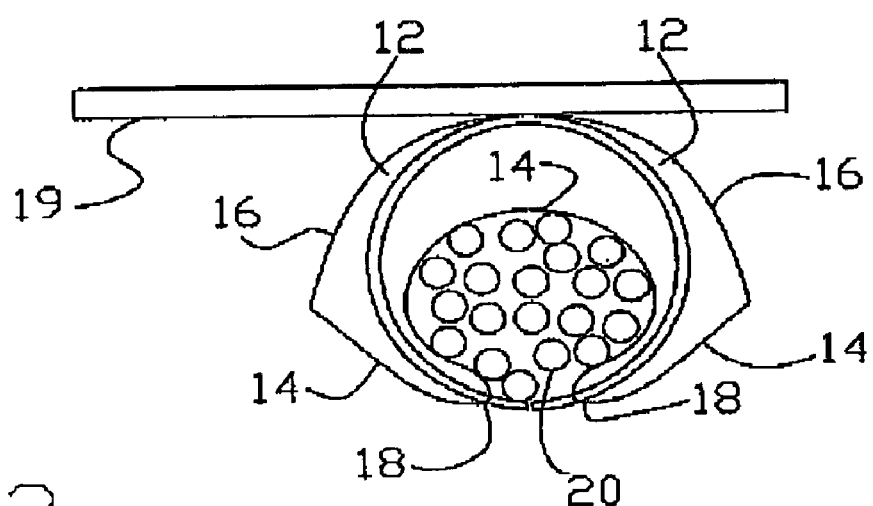
FIG. 2 shows a bunch of stems in a closed gripper.

FIG. 2 shows a bunch of stems 20 in gripper 11. here, gripper 11 is in closed position, in which the ends of fingers 12 at least substantially abut against each other. Gripper 11 is brought into the closed position when all stems for a bunch are in gripper 11. This is done by moving the ends of fingers 12 towards each other. After closure of the gripper 11, it is moved to the tying position. In the tying position, the stems are tied together, after which gripper 11 is opened and the tied stems are taken from gripper 11. Next, gripper 11 is brought into the receiving position again for receiving the stems of a next bunch.

The invention is not limited to the embodiment of gripper 11 shown in FIGS. 1 and 2. Thus, for instance, leaf springs 16 can be replaced by a different mechanism for tensioning band 14, for instance by one or more draw springs at the ends of band 14, or band 14 can be made of resiliently stretching material. Also, a leaf spring at just one end of band 14 could suffice. Openings 18 are preferably located on or near the ends of fingers 12 which during closure of the gripper are moved towards each other, but it will be clear that it is also possible to work with openings further away from these ends.

It will further be clear that the band 14 being flexible serves to embrace bunch of stems 20 flexibly, independently of the shape of the circumference of the bunch and the position of the stems relative to each other. To that end, within the meaning of the invention, the band needs to be so flexible as to allow its being pushed away by the stems in the plane of FIG. 1. Flexibility in other directions, for instance perpendicular to the plane of FIG. 1, is not necessary, but may of course be inherent to the type of band that is used.

This can be realized, for instance, by an elastic band or by a leaf spring which is sufficiently flexible in the pertinent direction.

Rollers 10, or at least the circumference thereof, are preferably made of resilient material, so that the surfaces of rollers 10 upon supply of the stems are pressed apart by the stems to the extent necessary to allow the stems to pass. Rollers 10 may be so mounted as to touch each other if no stem is being passed through, but naturally rollers 10 can also be mounted some distance apart, as long as the stems are clamped between rollers 10 during transport. The invention is not limited to resilient rollers. Alternatively, for instance the rotary shafts of rollers 10 can be spring-mounted. In principle, only one roller needs to spring, and it is even possible to work without springing if the resilience of the stems is sufficient for them to be clamped between the rollers.

Further, the bunching apparatus preferably includes drive mechanisms for rotating rollers 10 and for moving gripper 11 away from rollers 10. Both rollers 10 may be driven, but in principle driving a single roller 10 suffices. These driving mechanisms are not further shown because they can be implemented by those skilled in the art without any further invention.

Figure 3:
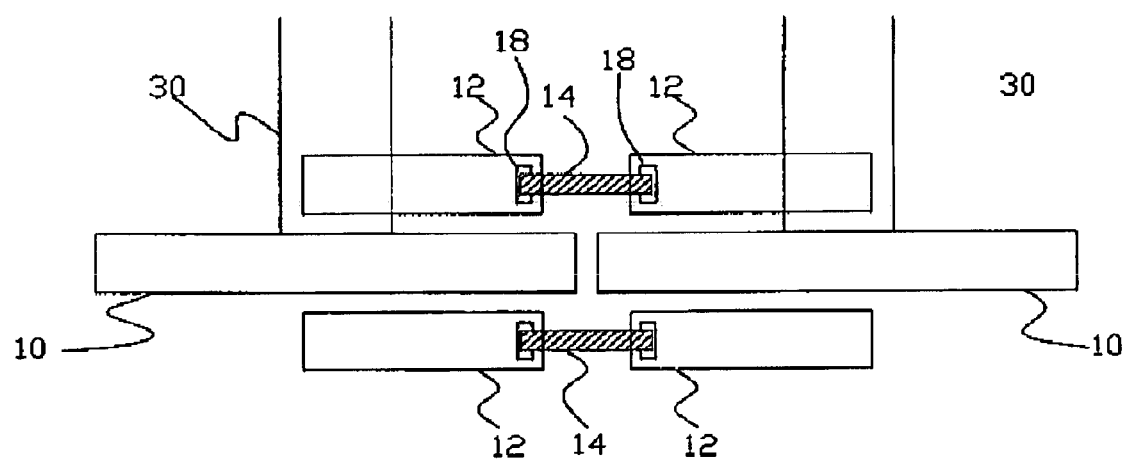
FIG. 3 shows a side elevation of a gripper and a pair of rollers.

FIG. 3 shows a further embodiment of the machine in a schematic cutaway side elevation in the receiving position. There are shown rollers 10 and a part of fingers 12, the sets being arranged on mutually opposite sides of rollers 10. For each set, gripper 11 includes a flexible band 14 as described with reference to FIG. 1. By making use of different sets of fingers 12 on opposite sides of roller 10, a more reliable intake of the stems is obtained. Depending on the kinds of stems and the thickness of fingers 12, however, a single set of fingers 12 may suffice under certain circumstances.

Figure 4:
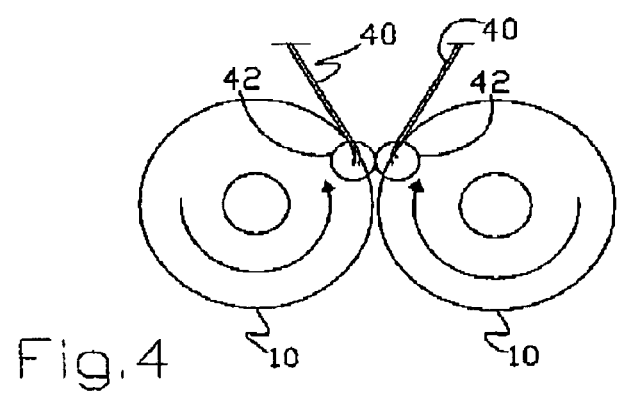
FIG. 4 shows a pair of rollers with hold-off lips.

FIG. 4 shows a top plan view of an embodiment of the machine. In this embodiment, lips 40 have been added, having thereon essentially freely rotating wheels 42. Lips 40 are mounted resiliently, or are resilient themselves, and are connected with a frame (not shown) on which also the shafts 30 of rollers 10 are mounted, so that wheels 42 are pressed towards each other through the spring force.

Lips 40 and wheels serve to receive a stem which is being supplied between rollers 10 and to subsequently press it away from rollers 10. The stem, driven by rollers 10, thereby pushes wheels 42 apart, and after the stem has been pushed sufficiently far between wheels 42, wheels 42, under the influence of the resilient action of lips 40, push the stem further away from rollers 10. In the process, wheels 42 rotate freely to the extent that the stems are not detained. Lips 40 proceed to ensure that the stems are held clear of the rollers and are not damaged, do not move or rotate by the action of the rollers 10.

The position of lips 40 has been chosen such that wheels 42 have this effect. The positioning relative to rollers 10 required for this purpose depends on the diameter of the stems that are processed with the machine. On the one hand, rollers 10 must be able to advance stems beyond the point where wheels 42 push the stems further on. On the other hand, wheels 42 must be positioned so far as to push on the stems beyond a point where rollers can still touch the stem.

Although at the end of the lips 40 preferably wheels 42 are mounted, it will be clear that the pushing action can also be obtained in a different manner, for instance by rounding of the lips, the lips being smooth at least adjacent the rounding. Wheels 42 rotating essentially freely have the advantage of entailing less risk of damage to the stems.

It will be clear, for that matter, that the use of lips 40 is not limited to use in combination with a gripper. Also in the case where the stems are received in a different way, possibly even with a band passing between rollers 10, lips 40 can be useful to prevent damage of the stems due to continuous contact with rollers 10. Rollers 10 can therefore rotate permanently while different stems of a bunch are being passed through, which simplifies the design of the machine considerably. In combination with gripper 11, lips 40 are particularly advantageous because lips 40 push stems into the band better, especially if the rounding of lips 40 (specifically of wheels 42) is smaller than that of rollers 10.

Figure 5:
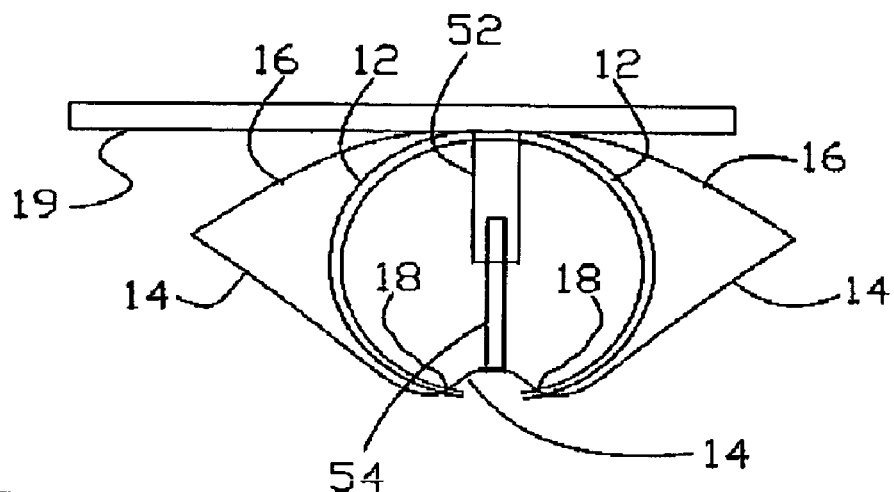
FIG. 5 shows a gripper with a band upholder.

FIG. 5 shows a top plan view of a further embodiment of gripper 11. In this embodiment, an upholder has been added for supporting flexible band 14 between fingers 12. The upholder is designed, by way of example, with a fixed part 52 which is mounted on arm 19 and an extendible part 54 which is secured to band 14 and slidably mounted in fixed part 52, so that movable part 54 can reciprocate in one direction with movement of band 14.

The upholder prevents the possibility of the band 14 sagging, so that the stems might end up at unequal height in the bunch. Of course, this is not always necessary, depending on the sagging capacity of band 14, the diameter of the stems, the size and the weight of bunches to be formed, and so forth, but when using thin bands that are flexible in all directions, the upholder can be useful.

Naturally, the invention is not limited to the upholder shown. Thus, the upholder can be designed, for instance, as a stiff element which is slidably arranged in slots (not shown) in mutually opposite fingers 12 and which is connected with band 14 centrally between fingers 12. According as more stems are pressed into band 14, the element slides further rearwards in gripper 11, thereby supporting band 14 while the element itself continues to be supported on fingers 12.

Figure 6:
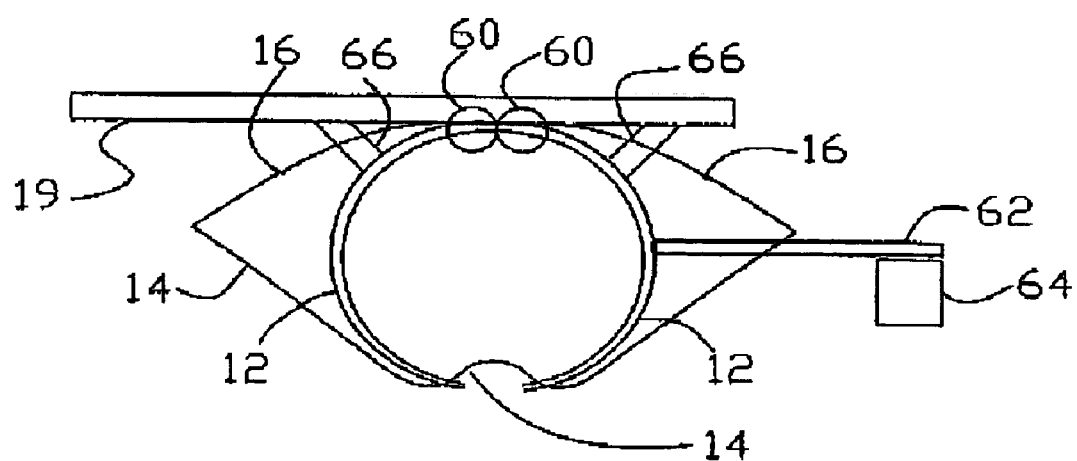
FIG. 6 shows a gripper with opening and closing mechanism.

FIG. 6 shows a mechanism for opening and closing fingers 12. This mechanism comprises a pair of gearwheels 60, an engagement element 62, a stop 64 and a pair of springs 66. The shafts of gearwheels 6—are mounted on arm 19, fingers 12 are connected with gearwheels 60 and gearwheels 60 mesh, so that rotation of a gearwheel 60 by one of the fingers 12 causes the opposite finger to rotate in opposite direction. Engagement element 62 is mounted on one of the respective fingers, so that a lateral force on engagement element 62 leads to a couple on gearwheels 60. Stop 64 is connected with a frame (not shown) on which rollers 10 are mounted.

In operation, stop 64 contacts engagement element 62 when gripper 11 is moved towards rollers 10. Stop 64 thereupon exerts a force on engagement element 62, whereby finger 12 on which engagement element 62 is mounted, is rotated, so that the jaw between fingers 12 opens. Gearwheels 60 transmit the rotation of one finger to the other finger. The same action can be used for taking out the bunch of stems after these have been tied together in gripper 11.

When the gripper 11 is moved away from rollers 10, the force on engagement element 62 is removed. Under those circumstances, springs 66 push the ends of fingers 66 against each other again.

When several sets of fingers 12 are used, successive fingers can each be coupled to gearwheels 60, so that pushing open one finger causes all other fingers to be pushed open along with it.

The closing mechanism shown has the advantage that in a simple manner, it is guaranteed that fingers 12 open and closed at the proper time to form and retain bunches. Without departing from the invention, however, other closing mechanisms can be used, for instance with a motor drive under the control of microswitches, or a microcomputer which also controls the movements of gripper 11. Both fingers 12 can be driven, for instance with engagement element 62 on both fingers and springs 66 on both fingers, but in principle driving a single finger 12 suffices for opening and closing fingers 12 of gripper 11.

The invention claimed is:

1. In a machine for bunching plant stems wherein plant stems are transported by a supply mechanism to a receiving mechanism that collects the plant stems into bunches, the improvement wherein the receiving mechanism includes a mechanical gripper that receives and bunches the plant stems, the gripper including a pair of mechanical fingers movably mounted in the machine so as to be capable of mutually gripping together when the fingers are moved to a closed position, the fingers also having an open position wherein the fingers are separated, at least a part of a flexible band being tensioned between the fingers, the finger and flexible band being positioned on a discharge side of the supply mechanism, the flexible band resiliently receiving and engaging stems that are received laterally from the discharge side of the supply mechanism between the fingers when the fingers are in an open position, the fingers causing the flexible band to encircle the stems and hold them in a bunch when the fingers are moved to a closed position, the fingers being moved between an open and closed position by an opening and closing mechanism.

2. A gripper according to claim 1, provided with a further pair of fingers capable of mutually gripping together, wherein at least a part of a further flexible band is tensioned between the fingers, wherein the pair of fingers and the further pair of fingers are included parallel to each other, with a space therebetween for receiving a pair of rollers in a non-gripping manner.

3. A gripper according to claim 1, provided with a pair of meshing gearwheels which are coupled to the fingers to transmit an opening push force from one finger to the other, and at least one spring element which is coupled to at least one of the fingers to move ends of the fingers towards each other when from outside the gripper no opening push force is exerted.

4. A gripper according to claim 1, provided with an upholder having a point of connection which is connected to a part of the band between the fingers, the upholder being so arranged as to allow a movement of the point of connection in a direction from an opening between the fingers, the movement being limited to movement in a plane through both fingers.

5. A machine according to claim 1 and further comprising a movement mechanism for moving the mechanical gripper relative to the supply mechanism between a receiving position and a tying position, in which receiving position the part of the band that is tensioned between the fingers is arranged on a discharge side of the supply mechanism in position such that stems carried along by the supply mechanism are received with the band between the fingers, and in which tying position the fingers enclose the received stems with the band, but the stems, compared with the receiving position, are arranged further away from the supply mechanism.

6. In a machine for bunching plant stems, wherein plant stems are conveyed to a receiving mechanism where the plant stems are gathered together in a bunch, the improvement wherein the receiving mechanism comprises a gripper having a pair of mechanical fingers capable of mutually gripping together, a flexible band extending under tension between the fingers, the gripper receiving plant stems from the supply mechanism laterally through the fingers and against the flexible band when the fingers are in an open position, the fingers being closeable by a closing mechanism to hold the plant stems together in a bunch within the flexible band until such time as the bunch can be tied together, the fingers thereafter being openable to release the tied bunch.

7. A method for bunching plant stems comprising:
transporting the plant stems sequentially to a receiving position by means of a supply mechanism; receiving the plant stems laterally from the supply mechanism and collecting them in bunches by means of a receiving apparatus that includes a flexible band maintained under tension and extending between a pair of mechanical fingers that are positioned on a discharge side of the supply mechanism and movable between open and closed positions, the plant stems being transported through the fingers into engagement with the band when the fingers are opened, the band forming a resiliently enlarging loop around the stems as they are received between the fingers, the fingers being closeable to close the resilient loop around the stems when a bunch of stems is completed.

8. A method as in claim 7 wherein the receiving apparatus is movably mounted for movement toward and from the supply mechanism, the receiving apparatus being moved away from the supply mechanism for manually binding the plants in a bunch after the stems have been collected in a bunch with the receiving mechanism positioned toward the supply mechanism.

\* \* \* \* \*